| United States Patent [19] | [11] Patent Number: 4,892,895 |
| Arai et al. | [45] Date of Patent: * Jan. 9, 1990 |

[54] ULTRAVIOLET-CURABLE ORGANOPOLYSILOXANE COMPOSITION

[75] Inventors: Masatoshi Arai; Shinichi Satoh; Kazutoshi Fujioka, all of Gunma, Japan

[73] Assignee: Shin-Etsu Chemical Co., Ltd., Tokyo, Japan

[*] Notice: The portion of the term of this patent subsequent to Apr. 5, 2005 has been disclaimed.

[21] Appl. No.: 150,166

[22] Filed: Jan. 29, 1988

[30] Foreign Application Priority Data

Jan. 30, 1987 [JP] Japan .................................. 62-19711

[51] Int. Cl.$^4$ .............................................. C08F 2/46
[52] U.S. Cl. ....................................... 522/99; 528/30; 528/32
[58] Field of Search ....................... 522/99; 528/30, 32

[56] References Cited

U.S. PATENT DOCUMENTS

| 4,339,563 | 7/1982 | Takago et al. | 528/32 |
| 4,579,636 | 4/1986 | Inoue et al. | 522/99 |
| 4,735,971 | 4/1988 | Inoue et al. | 522/42 |
| 4,742,092 | 5/1988 | Inoue et al. | 522/27 |

*Primary Examiner*—John C. Bleutge
*Assistant Examiner*—R. Dean, Jr.
*Attorney, Agent, or Firm*—Millen, White & Zelano

[57] ABSTRACT

The ultraviolet-curable organopolysiloxane composition comprises (A) a first organopolysiloxane having, in a molecule, at least one isopropenyloxysilyl-substituted ethyl or propyl group, (B) a second organopolysiloxane having, in a molecule, at least 2 silicon-bonded mercaptoalkyl groups, (C) an organosilicon compound having at leaast one vinyl group in a molecule and (D) a photosensitizer. The composition can be rapidly cured by exposure to ultraviolet light into a cured silicone rubber body without the problems and disadvantages in the conventional ultraviolet-curable silicone rubber compositions.

14 Claims, No Drawings

ULTRAVIOLET-CURABLE ORGANOPOLYSILOXANE COMPOSITION

BACKGROUND OF THE INVENTION

The present invention relates to an ultraviolet-curable organopolysiloxane composition or, more particularly, to an organopolysiloxane composition capable of being cured by exposure to ultraviolet light within a relatively short time to give a cured rubbery elastomer having excellent water-resistance and useful as an adhesive, sealing material, FIPG material, potting agent, coating agent and the like.

In the prior art, several types of ultraviolet-curable organopolysiloxane compositions are known, of which those disclosed in Japanese patent publication 54-6512 are prepared by compounding a first organopolysiloxane having vinyl groups directly bonded to the silicon atoms, a second organopolysiloxane having mercaptoalkyl groups bonded to the silicon atoms and an initiator for the photochemical reaction between the vinyl groups and the mercapto groups. A disadvantage in the ultraviolet-curable organopolysiloxane composition of this type is that the photochemical reaction is susceptible to inhibition by oxygen so that curing of the composition is sometimes incomplete in the portion in contact with air and complete curing can be obtained only by exposure to ultraviolet light in an atmosphere of an inert gas.

With an object to overcome the above mentioned disadvantage in organopolysiloxane composition curable by the addition reaction between silicon-bonded vinyl groups and mercapto groups, an improved organopolysiloxane composition has been previously proposed which comprises a first organopolysiloxane having silanolic hydroxy groups, a second organopolysiloxane having silicon-bonded isopropenyloxy groups, a third organopolysiloxane having Mercapto groups, a curing agent and a photosensitizer. The composition of this type is curable by two different mechanisms, one being an ultraviolet-induced addition reaction and the other being a condensation reaction which proceeds in the presence of moisture so that the composition is advantageous with respect to the possibility of complete curing even in the portion not under direct exposure to ultraviolet or when the composition contains a coloring agent. A problem in the composition of this type is its relatively poor adhesive bonding strength immediately after exposure to ultraviolet light.

It has been discovered that the ultraviolet-curable organopolysiloxane composition of the above described type can be imparted with an improved incipient adhesive bonding strength immediately after exposure to ultraviolet light when the composition is admixed with an organosilane compound or organopolysiloxane compound having at least three hydrolyzable groups in the molecule. The admixture of such an additive, however, causes some problems, viz., the composition is relatively unstable and sometimes becomes cloudy when kept under an atmosphere of high humidity and the cured rubber obtained from the composition has a relatively poor mechanical strength.

SUMMARY OF THE INVENTION

The present invention accordingly has an object to provide an ultraviolet-curable organopolysiloxane composition free from the above described problems and disadvantages in the prior art compositions.

Thus, the ultraviolet-curable organopolysiloxane composition of the present invention comprises, in admixture:

(A) a first organopolysiloxane having, in a molecule, at least one organosilyl-substituted alkyl group represented by the general formula

$$-(-CH_2-)_a-Si(O-CMe=CH_2)_b(OR)_c(Me)_d, \quad (I)$$

in which Me is a methyl group, R is a monovalent hydrocarbon group free from aliphatic unsaturation, a is 2 or 3, b is 1, 2 or 3 and c and d are each 0, 1 or 2 with the proviso that $b+c+d=3$;

(B) an organosiloxane compound having at least one vinyl group bonded to the silicon atom in a molecule in an amount sufficient to provide from 0.1 to 20 moles of mercaptoalkyl groups per mole of isopropenyloxy groups in the component (A);

(C) an organosilicon compound or, preferably, an organosilane compound having at least one vinyl group bonded to the silicon atom in a molecule in an amount sufficient to provide from 0.01 to 10 moles of vinyl groups per mole of isopropenyloxy groups in the component (A); and (D) a photosensitizer in an amount effective to promote the ultraviolet-induced reaction of the components (A), (B) and (C) or, for example, in an amount from 0.01 to 10 parts by weight per 100 parts by weight of the component (A).

DETAILED DESCRIPTION OF THE PREFERRED EMBODIMENTS

In the following, the above defined components (A) to (D) essential in the inventive organopolysiloxane composition are described in detail. The component (A) is an organopolysiloxane having, in a molecule, at least one organosilyl-substituted alkyl group repre-sented by the general formula (I) given above, i.e.

$$-(-CH_2-)_a-Si(O-CMe=CH_2)_b(OR)_c(Me)_d,$$

in which Me is a methyl group and R is a monovalent hydrocarbon group free from aliphatic unsaturation exemplified by alkyl groups such as methyl, ethyl, propyl and butyl groups, aryl groups such as phenyl and tolyl groups and cycloalkyl groups such as cyclohexyl group as well as those substituted groups obtained by replacing a part or all of the hydrogen atoms in the above named hydrocarbon groups with halogen atoms, cyano groups and the like. The group denoted by R should have 18 or less of carbon atoms. The subscript a is 2 or 3 so that the group represented by the general formula (I) is an organosilyl-substituted ethyl or propyl group. The subscript b is 1, 2 or 3 so that the organopolysiloxane should have at least one silicon-bonded isopropenyloxy group in a molecule. The subscripts c and d are each 0, 1 or 2 with the proviso that $b+c+d=3$.

One of the preferable forms of the organopolysiloxane as the component (A) is expressed by the following general structural formula

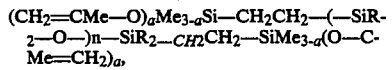

$$(CH_2=CMe-O)_a Me_{3-a}Si-CH_2CH_2-(-SiR_2-O-)_n-SiR_2-CH_2CH_2-SiMe_{3-a}(O-C-Me=CH_2)_a,$$

in which Me is a methyl group and R and a each have the same meaning as defined above.

Several examples of the organopolysiloxane suitable as the component (A) include those expressed by the following structural and unit formulas, in which the symbols Ipo, Me and Ph denote isopropenyloxy, methyl and phenyl groups, respectively, and the subscripts l, m and n are each a positive integer:

Ipo$_2$MeSi—CH$_2$CH$_2$—(—SiMe$_2$—O—)-$_n$—SiMe$_2$—CH$_2$CH$_2$—SiMeIpo$_2$;

Me$_3$Si—O—[—SiMe$_2$—O—]$_n$—]—SiMe(CH$_2$CH$_2$SiIpo$_2$.OMe)—O—]$_m$—SiMe$_3$;

IpoMe$_2$Si—CH$_2$CH$_2$—SiMe$_2$—(—O—SiMe$_2$—)-$_n$—(—O—SiPh$_2$—)$_m$—(—O—SiMePh—)-$_l$—CH$_2$CH$_2$—SiMe$_2$Ipo; and (Ipo$_3$Si—CH$_2$CH$_2$—)$_l$(MeSiO$_{1.5}$)$_m$(Me$_3$SiO$_{0.5}$)$_n$.

The organopolysiloxane as the component (A) can be prepared by heating a mixture composed of an organopolysiloxane having, in a molecule, at least one ethylenically unsaturated group, e.g., vinyl and allyl groups, such as an α,ω-divinyl dimethylpolysiloxane or an organopolysiloxane of a linear or branched molecular structure having vinyl or allyl groups as the pendant groups, and an isopropenyloxy-containing organohydrogensilane compound represented by the general formula HSi(O—CMe=CH$_2$)$_b$(OR)$_c$(Me)$_d$, in which the symbols each have the same meaning as defined above, in the presence of a platinum catalyst to effect the addition reaction or the so-called hydrosilation reaction.

Several examples of the isopropenyloxy-containing organohydrogensilane compound represented by the above given general formula include those expressed by the following structural formulas, in which the symbols Ipo, Me, Et, Bu and Ph denote isopropenyloxy, methyl, ethyl, butyl and phenyl groups, respectively:

HSiMeIpo$_2$;

HSiIpo$_3$;

HSiMeIpo(OMe);

HSiMeIpo(OBu);

HSiIpo(OPh)$_2$;

HSiIpo(OMe)$_2$;

HSiIpo$_2$(OCH$_2$CH$_2$CH$_2$CH$_3$); and

HSiIpo(O—CH$_2$—Ph)$_2$.

The component (B) is the second organopolysiloxane having, in a molecule, at least two mercaptoalkyl groups. When the inventive composition is exposed to ultraviolet light, an addition reaction takes place between the mercapto groups in this component and the isopropenyloxy groups in the component (A) to form crosslinks. The organopolysiloxane may have a cyclic structure or a linear structure as exemplified by those compounds expressed by the following structural formulas, in which the symbols Me and Ph are methyl and phenyl groups, respectively, the subscripts p is an integer of at least 3, q, r and s are each zero or a positive integer and t is an integer of at least 2:

[—Si(OMe)(CH$_2$SH)—O—]$_p$;

[—SiMe(CH$_2$SH)—O—]$_p$;

[—Si(OMe)(CH$_2$CH$_2$SH)—O—]$_p$;

[—Si(OMe)(CH$_2$CH$_2$CH$_2$SH)—O—]$_p$;

[—SiMe(CH$_2$CH$_2$SH)—O—]$_p$;

[—SiMe(CH$_2$CH$_2$CH$_2$SH)—O—]$_p$;

[—Si(O—SiMe$_2$)(CH$_2$CH$_2$CH$_2$SH)—O—]$_p$;

HS—C$_3$H$_6$—SiMe(OMe)—O—[—SiMe$_2$—O—]-$_q$—]—SiPh$_2$—O—]$_r$—[—SiMe(C$_3$H$_6$SH)—O—]-$_s$—SiMe(OMe)—C$_3$H$_6$SH; and Me$_3$Si—O—[—SiMe$_2$—O—]$_q$—[—SiPh$_2$—O—]-$_r$—[—SiMe(C$_3$H$_6$SH)—O—]$_s$—SiMe$_3$.

These mercaptoalkyl-containing organopolysiloxanes can be used either singly or as a combination of two kinds or more according to need. The amount of the component (B) in the inventive composition should be sufficient to provide from 0.1 to 20 or, preferably, from 0.5 to 5 moles of mercaptoalkly groups per mole of isopropenyloxy groups in the component (A). When the amount of the component (B) is too small, the reaction to cause viscosity increase can proceed only insufficiently. When the amount thereof is too large, on the other hand, the hardness of the composition may be too high after curing by exposure to ultraviolet light.

The component (C) is an organosilicon compound having at least one vinyl group in a molecule. This component serves to improve the water-resistance of the rubbery elastomer obtained by curing the inentive composition, presumably, by decreasing the hydrolyzability of the silicon-bonded alkoxy groups produced by the reaction between the isopropenyloxy groups in the component (A) and the mercapto groups in the component (B). The vinyl-containing organosilicon compound as the component (C) can be an organosilane or organopolysiloxane compound having a straightly linear, branched three-dimensional or cyclic molecular structure. The organosilicon compound is preferably an organosilane compound represented by the general formula CH$_2$=CHSiR$_e$(OR)$_{3-e}$, in which R is a monovalent hydrocarbon group free from aliphatic unsaturation and the subscript e is zero, 1, 2 or 3. Several examples of the organosilicon compound suitable as the component (C) include those expressed by the following structural formulas, in which the symbols Me, Et, Vi and Ph denote methyl, ethyl, vinyl and phenyl groups, respectively, n is 0, 1, 2 or 3, m is 1, 2 or 3 and p is 3, 4, 5 or 6:

ViSiMe$_n$(OMe)$_{3-n}$;

ViSiMe$_n$(OEt)$_{3-n}$;

ViSiMe$_n$(O—CMe=CH$_2$)$_{3-n}$;

ViSiMe$_n$(O—CO—Me)$_{3-n}$;

Vi$_m$Me$_{3-m}$Si—O—SiMe$_{3-m}$Vi$_m$;

ViSiMe$_n$(O—C=N—CEt=CH$_2$)$_{3-n}$;

ViSiMe$_n$(NCO)$_{3-n}$;

Vi—SiMePh—O—SiMePh—Vi;

(ViMePhSi)$_2$NH;

$\left[-\text{SiViMe}-\text{O}-\right]_p$; and $\left[-\text{SiVi(OMe)}-\text{O}-\right]_p$.

These vinyl-containing organosilicon compounds can be used either singly or as a combination of two kinds or more according to need. The amount of the component (C) in the inventive composition should be sufficient to provide from 0.01 to 10, preferably, from 0.1 to 1 mole of vinyl groups per mole of isopropenyloxy groups in the component (A). When the amount of the component (C) is too small, no advantageous effect can be obtained by the addition thereof. When the amount thereof is too large, on the other hand, an adverse effect on the curability of the composition into a rubbery elastomer occurs.

The component (D) in the inventive organopolysiloxane composition is a photosensitizer which promotes the photochemical reaction between the isopropenyloxy groups in the component (A) and the mercapto groups in the component (B) by exposure to ultraviolet light. Various kinds of known photosensitizers are useful also in the inventive composition including acetophenone, propiophenone, benzophenone, xanthone, fluorene, benzaldehyde, anthraquinone, triphenyl amine, carbazole, 3-methyl acetophenone, 4-methyl acetophenone, 3-pentyl acetophenone, 4-methoxy acetophenone, 3-bromo acetophenone, 4-allyl acetophenone, p-diacetyl benzene, 3-methoxy benzophenone, 4-methyl benzophenone, 4-chloro benzophenone, 4,4'-dimethoxy benzophenone, 4-chloro-4'-benzyl benzophenone, 3-chloro xanthone, 3,9-dichloro xanthone, 3-chloro-8-nonyl xanthone, benzoin, benzoin methyl ether, benzoin butyl ether, bis(4-dimethylamino phenyl) ketone, benzyl methoxy ketal, 2-chloro thioxanthone and the like.

The amount of the photosensitizer as the component (D) in the inventive composition should be sufficient to give a desired curing velocity of the inventive composition upon exposure to ultraviolet light and is not particularly limitative. Usually, the amount is selected in the range from 0.01 to 10 parts by weight, preferably, from 0.05 to 2 parts by weight per 100 parts by weight of the component (A).

The ultraviolet-curable organopolysiloxane composition of the invention can be prepared by uniformly blending the above described components (A) to (D). It is optional that the composition is admixed with a filler when improvement is desired in the mechanical properties of the composition after curing. Suitable fillers are exemplified by fumed silica, calcined silica, precipitated silica, fumed titanium dioxide, carbon black, calcium carbonate, diatomaceous earth, calcium silicate and the like, optionally, subjected to a hydrophobic treatment on the surface with organochlorosilanes, organopolysiloxanes, hexamethyl disilazane and the like. The amount of the filler in the inventive organopolysiloxane composition, when added, should not exceed 300 parts by weight per 100 parts by weight of the component (A) because the inventive composition compounded with a too large amount of a filler is poorly workable due to a decrease in the flowability thereof or the cured rubber obtained from the composition by ultraviolet irradiation may have an unduly high elastic modulus.

In addition to the above mentioned fillers, the inventive organopolysiloxane composition may optionally be admixed according to need with various kinds of additives conventionally used in room temperature-curable organopolysiloxane compositions including coloring agents, heat- and cold-resistance improvers, thixotropy modifiers, dehydrating agents, flame retardants, oil resistance improvers, adhesives and the like each in a limited amount.

The organopolysiloxane composition of the present invention can be rapidly cured under exposure to ultraviolet light to give a cured rubbery elastomer. The thus obtained cured silicone rubber is very stable and even in an atmosphere of high humidity does not cause cloudiness or a decrease in the rubbery properties thereof so that the inventive composition can be used advantageously as an adhesive, material for FIPG, materials for sealing, potting and coating and so on in a variety of industrial fields.

In the following, the ultraviolet-curable organopolysiloxane composition of the invention is described in detail by way of examples as preceded by the description of the synthetic procedure of the organopolysiloxane as the component (A). In the examples given below, the term of "parts" refers to "parts by weight" and the values of viscosity are all those obtained by the measurement at 25° C.

PREPARATION 1

Into a flask of 2 liter capacity having a separable cover and equipped with a reflux condenser were introduced 1000 g of an α,ω-divinyl dimethylpolysiloxane having an average number of the silicon atoms in a molecule of 151 together with 500 g of toluene and the mixture was heated under reflux to discharge distilled water out of the discharge stopcock of the reflux condenser. After cooling to room temperature, the thus dehydrated mixture in the flask was admixed with 0.2 g of an isopropyl alcohol solution of chloroplatinic acid in a concentration of 2% by weight as platinum and 19.0 g of methyl diisopropenyloxy silane and heated at 90° C. for 2 hours to effect the reaction followed by removal of toluene by distillation under reduced pressure to give 980 g of a clear and colorless oily product having a viscosity of 530 centistokes, specific gravity of 0.975 and refractive index of 1.045. The results of the NMR analysis of this product led to a conclusion that it was an organopolysiloxane expressed by the structural formula

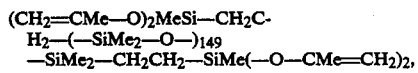

which is referred to as the polysiloxane I hereinbelow.

PREPARATION 2

The synthetic procedure was substanttially the same as in Preparation 1 described above excepting replacement of the α,ω-divinyl dimethylpolysiloxane with the same amount of an α,ω-divinyl dimethyl diphenyl polysiloxane expressed by the structural formula ViMe$_2$Si—O—(—SiMe$_2$—O—)$_{450}$—(—SiPh$_2$—O—)$_5$—o—SiMe$_2$Vi, in which Me, Ph and Vi are methyl, phenyl and vinyl groups respec-tively, and decrease of the amount of the methyl diisopropenyloxy silane to 8.8 g to give 950 g of a clear and colorless oily product having a viscosity of 15,000 centistokes, specific gravity of 1.035 and refractive index of 1.451. This product could be identified from the results of the NMR analysis to be an organopolysiloxane expressed by the structural formula

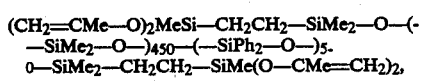

which is referred to as the polysiloxane II hereinbelow.

EXAMPLE 1 AND COMPARATIVE EXAMPLE 1.

An organopolysiloxane composition, which is referred to as the composition I hereinbelow, was prepared by uniformly blending, in a dry atmosphere, 100 parts of the polysiloxane I obtained in Preparation 1, 3 parts of a mercapto-containing organopolysiloxane expressed by the structural formula

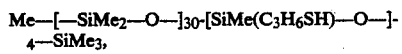

which is referred to as the mercapto-siloxane I hereinbelow, 0.5 part of trimethoxy vinyl silane, which is referred to as TMVS hereinbelow, and 0.5 part of diethoxy acetophenone, which is referred to as DEAP hereinbelow, as a photosensitizer.

For comparison, another organopolysiloxane composition, referred to as the composition II hereinbelow, was prepared with the same formulation as above excepting omission of the TMVS.

Each of the compositions I and II was cast into a tray-like metal mold of 120 mm by 120 mm wide in a depth of 2 mm and exposed for 30 minutes to ultraviolet light of 365 nm wavelength emitted from an ultraviolet lamp at an intensity of 1.5 mW/cm$^2$ so that the composition was cured and converted into a rubbery elastomer. The thus obtained rubber sheets were subjected to the measurement of the mechanical properties either as cured or after 1000 hours of accelerated aging at 50° C. in an atmosphere of 90% relative humidity to give the results in Table 1 below.

TABLE 1

| Composition | As cured | | After aging | |
|---|---|---|---|---|
| | I | II | I | II |
| Hardness, JIS A | 6 | 8 | 10 | 2 |
| Tensile strength, kg/cm$^2$ | 1.4 | 1.4 | 1.4 | 0.3 |
| Ultimate elongation, % | 180 | 70 | 70 | 20 |

EXAMPLES 2 TO 5.

Organopolysiloxane compositions, referred to as the compositions III, IV, V and VI hereinbelow, were prepared each by uniformly blending, in a dry atmosphere, 100 parts of the polysiloxane I or II obtained in Preparation 1 or 2 described above with the mercapto-siloxane I or another mercapto-containing organopolysiloxane, referred to as the mercapto-siloxane II hereinbelow, expressed by the structual formula

TMVS, DEAP, 1-hydroxycyclohexyl phenyl ketone, referred to as HCPK hereinbelow, and a reinforcing fumed silica filler having a specific surface area of 200 m$^2$/g and hydrophobic surface by treatment with hexamethyl disilazane, which is referred to as the silica I hereinbelow, each in an amount indicated in Table 2 below.

The composition III to VI were each cured into a sheet-like form in the same manner as in Example 1 by exposure to ultraviolet light which was subjected to measurement of the mechanical properties either as cured or after accelerated aging in the same manner as in Example 1 to give the results shown in Table 3.

TABLE 2

| Composition | III | IV | V | VI |
|---|---|---|---|---|
| Polysiloxane | I | I | II | II |
| Mercaptosiloxane(parts) | I(33) | II(5) | I(10) | I(10) |
| TMVS, parts | 1 | 0.5 | 0.5 | 0.5 |
| DEAP, parts | 0.5 | 0 | 1.0 | 0 |
| HCPK, parts | 0 | 0.5 | 0 | 1.0 |
| Silica I, parts | 17 | 0 | 0 | 10 |

TABLE 3

| Composition | As cured | | | | After aging | | | |
|---|---|---|---|---|---|---|---|---|
| | III | IV | V | VI | III | IV | V | VI |
| Hardness, JIS A | 16 | 9 | 2 | 8 | 21 | 9 | 2 | 10 |
| Tensile strength, km/cm$^2$ | 5.0 | 1.5 | 1.4 | 9.0 | 7.7 | 1.7 | 1.5 | 9.4 |
| Ultimate elongation, % | 130 | 100 | 300 | 450 | 150 | 120 | 350 | 490 |

EXAMPLES 6 TO 8 AND COMPARATIVE EXAMPLES 2 AND 3.

Organopolysiloxane compositions, referred to as the compositions VII, VIII and IX hereinbelow, were prepared each by uniformly blending, in a dry atmosphere, 100 parts of the polysiloxane I or II prepared in Preparation 1 or 2, respectively, with dimethoxy methyl vinyl silane, referred to as DMVS hereinbelow, tetramethyl tetravinyl tetrasiloxane, referred to as TVTS hereinbelow, triacetoxy vinyl silane, referred to as TAVS hereinbelow, and 1-hydroxycyclohexyl phenyl ketone, referred to as HCPK hereinbelow, each in an amount indicated in Table 4 below.

For comparison, two more organopolysiloxane compositions, referred to as the composition X and XI hereinbelow, were prepared with the same formulations as above excepting replacement of the vinyl-containing organosilicon compound, i.e. DMVS or TVTS, with trimethoxy methyl silane or 3-methacryloxypropyl trimethoxy silane, referred to as TMMS and MAMS hereinbelow, respectively, having no vinyl groups, each in an amount indicated in Table 4.

The compositions VII to XI were each cured in the same manner as in Example 1 into a sheet-like form by exposure to ultraviolet light and subjected to the measurement of the mechanical properties either as cured or after accelerated aging also in the same manner as in Example 1 to give the results shown in Table 5 below.

TABLE 4

| Composition | VII | VIII | IX | X | XI |
|---|---|---|---|---|---|
| Polysiloxane | I | I | II | I | II |
| Mercapto-siloxane I, parts | 30 | 30 | 10 | 30 | 10 |
| DMVS, parts | 1 | | | | |
| TVTS, parts | | 0.5 | | | |
| TAVS, parts | | | 1 | | |
| TMMS, parts | | | | 1 | |
| MAMS, parts | | | | | 1 |
| HCPK, parts | 0.5 | 0.5 | 1 | 0.5 | 1 |

TABLE 5

| Composition | VII | VIII | IX | X | XI |
|---|---|---|---|---|---|
| As cured | | | | | |
| Hardness, JIS A | 6 | 8 | 2 | 6 | 2 |
| Tensile strength, kg/cm$^2$ | 1.2 | 1.2 | 1.5 | 1.2 | 1.4 |
| Ultimate elongation, % | 70 | 50 | 300 | 80 | 270 |
| After aging | | | | | |
| Hardness, JIS A | 7 | 9 | 3 | 1 | 0 |
| Tensile strength, kg/cm$^2$ | 1.4 | 1.5 | 1.8 | 0.4 | 1.3 |
| Ultimate elongation, % | 80 | 70 | 350 | 40 | 50 |

What is claimed is:

1. An ultraviolet-curable organopolysiloxane composition which comprises, in admixture:
   (A) its first organopolysiloxane having, in a molecule, at least one organosilyl-substituted alkyl group represented by the general formula —(—CH$_2$—)$_a$—Si(O—CMe=CH$_2$)$_b$(OR)$_c$(Me)$_d$, in which Me is a methyl group, R is a monovalent hydrocarbon group free from aliphatic unsaturation, a is 2 or 3, b is 1, 2 or 3 and c and d are each 0, 1 or 2 with the proviso that b+c+d=3;
   (B) a second organopolysiloxane having, in a molecule, at least two mercaptoalkyl groups bonded to the silicon atoms in an amount sufficient to provide from 0.1 to 20 moles of mercaptoalkyl groups per mole of the isopropenyloxy groups in the component (A);
   (C) an organosilicon compound having at least one vinyl group bonded to the silicon atom in its molecule, in an amount sufficient to provide from 0.01 to 10 moles of vinyl groups per mole of the isopropenyloxy groups in the component (A); and
   (D) a photosensitizer in an amount effective to promote the ultraviolet-induced reaction of the components (A), (B) and (C).

2. The ultraviolet-curable organopolysiloxane composition as claimed in claim 1 wherein the amount of the photosensitizer as the component (D) is in the range from 0.1 to 10 parts by weight per 100 parts by weight of the component (A).

3. The ultraviolet-curable organopolysiloxane composition as claimed in claim 1, wherein the organopolysiloxane as the composition (A) is represented by the general formula (CH$_2$=CMe—O)$_a$Me$_{3-a}$Si—CH$_2$CH$_2$—(—SiR$_2$—O—)$_n$—SiR$_2$—CH$_2$CH$_2$—SiMe$_{3-a}$(O—CMe=CH$_2$)$_a$, in which Me is a methyl group, n is a positive integer, and R and a each are as defined therein.

4. A cured silicone rubber body produced from the organopolysiloxane composition according to claim 1 by exposure to ultraviolet light.

5. The ultraviolet-curable organopolysiloxane composition as claimed in claim 1, wherein the organopolysiloxane as the component (A) is a compound selected from the group consisting of those having the following structural and unit formulas, in which the symbols Ipo, Me and Ph denote isopropenyloxy, methyl and phenyl groups, respective, and the subscripts l, m and n are each a positive integer:

Ipo$_2$MeSi—CH$_2$CH$_2$—(—SiMe$_2$—O—)$_n$—SiMe$_2$—CH$_2$CH$_2$—SiMeIpo$_2$;
Me$_3$Si—O—[—SiMe$_2$—O—]$_n$—[—SiMe(CH$_2$CH$_2$SiIpo$_2$—OMe)—O—]$_m$—SiMe$_3$;
IpoMe$_2$Si—CH$_2$CH$_2$—SiMe$_2$—(—O—SiMe$_2$—)$_n$—(—O—SiPh$_2$—)$_m$—(—O—SiMePh—)$_l$—CH$_2$CH$_2$—SiMe$_2$Ipo; and (Ipo$_3$Si—CH$_2$CH$_2$—)$_l$(MeSiO$_{1.5}$)$_m$(Me$_3$SiO$_{0.5}$)$_n$.

6. The ultraviolet-curable organopolysiloxane composition as claimed in claim 1, wherein the organopolysiloxane as the component (B) is a compound selected from the group consisting of those having the following structural formulas, in which the symbols Me and Ph are methyl and phenyl groups, respectively, the subscripts p is an integer of at least 3, q, r and s are each zero or a positive integer and t is an integer of at least 2:

[—Si(OMe)(CH$_2$SH)—O—]$_p$;

[—SiMe(CH$_2$SH)—O—]$_p$

[—Si(OMe)(CH$_2$CH$_2$SH)—O—]$_p$;

[—Si(OMe)(CH$_2$CH$_2$CH$_2$SH)—O—]$_p$;

[—SiMe(CH$_2$CH$_2$SH)—O—]$_p$;

[—SiMe(CH$_2$CH$_2$CH$_2$SH)—O—]$_p$;

[—Si(O—SiMe$_2$)(CH$_2$CH$_2$CH$_2$SH)—O—]$_p$;

HS—C$_3$H$_6$—SiMe(OMe)—O—[—SiMe$_2$—O—]$_q$—[—SiPh$_2$—O—]$_r$—[—SiMe(C$_3$H$_6$SH)—O—]$_s$—SiMe(OMe)—C$_3$H$_6$SH; and Me$_3$Si—O—[—SiMe$_2$—O—]$_q$—[—SiPh$_2$—O—]$_r$—[—SiMe(C$_3$H$_6$SH)—O—]$_t$—SiMe$_3$.

7. The ultraviolet-curable organopolysiloxane composition as claimed in claim 1, wherein the organopolysiloxane as the component (C) is a compound having the general formula CH$_2$=CHSiR$_e$(OR)$_{3-e}$, in which R is a monovalent hydrocarbon group free from aliphatic unsaturation and the subscript e is zero, 1, 2 or 3.

8. The ultraviolet-curable organopolysiloxane composition as claimed in claim 1, wherein the organopolysiloxane as the component (C) is a compound selected from the group consisting of those having the structural formulae, in which the symbols Me, Et, Vi and Ph denote methyl, ethyl, vinyl, and phenyl groups, respectively, n is 0, 1, 2 or 3, m is 1, 2 or 3 and p is 3, 4, 5 or 6;

$ViSiMe_n(OMe)_{3-n}$;

$ViSiMe_n(OEt)_{3-n}$;

$ViSiMe_n(O-CM_3=CH_2)_{3-n}$;

$ViSiMe_n(O-CO-Me)_{3-n}$;

$Vi_mMe_{3-m}Si-O-SiMe_{3-m}Vi_m$;

$ViSiMe_n(O-C=N-CEt=CH_2)_{3-n}$;

$ViSiMe_n(NCO)_{3-n}$;

$ViSiMePh-O-SiMePh-Vi$;

$(ViMePhSi)_2NH$;

$[-SiViMe-O-]_p$; and $[-SiVi(OMe)-O-]_p$.

9. The ultraviolet-curable organopolysiloxane composition as claimed in claim 1, wherein the amount of the component (B) provides from 0.5 to 5 moles of mercaptoalkyl groups per mole of isopropenyloxy groups in (A).

10. The ultraviolet-curable organopolysiloxane composition as claimed in claim 1, wherein the amount of the component (C) provides from 0.1 to 1 mole of vinyl groups per mole of isopropenyloxy groups in the component (A).

11. The ultraviolet-curable organopolysiloxane composition as claimed in claim 1, wherein the amount of the component (D) is from 0.05 to 2 parts by weight per 100 parts by weight of the component (A).

12. The ultraviolet-curable organopolysiloxane composition as claimed in claim 1, which further comprises up to 300 parts by weight of filler per 100 parts by weight of the component (A).

13. The ultraviolet-curable organopolysiloxane composition as claimed in claim 1, wherein the amount of the component (B) provides from 0.5 to 5 moles of mercaptoalkyl groups per mole of isopropenyloxy groups in (A); wherein the amount of the component (C) provides from 0.1 to 1 mole of vinyl groups per mole of isopropenyloxy groups in the component (A); and wherein the amount of the component (D) is from 0.05 to 2 parts by weight per 100 parts by weight of the component (A).

14. The ultraviolet-curable organopolysiloxane composition as claimed in claim 13, wherein the organopolysiloxane as the component (A) is a compound selected from the group consisting of those having the following structural and unit formulas, in which the symbols Ipo, Me and Ph denote isopropenyloxy, methyl and phenyl groups, respective, and the subscripts l, m and n are each a positive integer:

$Ipo_2MeSi-CH_2CH_2-(-SiMe_2-O-)_n-SiMe_2-CH_2CH_2-SiMeIpo_2$;

$Me_3Si-O-[-SiMe_2-O-]_n-[-SiMe(CH_2CH_2SiIpo_2-OMe)-O-]_m-SiMe_3$;

$IpoMe_2Si-CH_2CH_2-SiMe_2-(-O-SiMe_2-)_n-(-O-SiPh_2-)_m-(-O-SiMePh-)_l-CH_2CH_2-SiMe_2Ipo$; and $(Ipo_3Si-CH_2CH_2-)_l(MeSiO_{1.5})_m(Me_3SiO_{0.5})_n$;

wherein the organopolysiloxane as the component (B) is a compound selected from the group consisting of those having the following structural formulas, in which the symbols Me and Ph are methyl and phenyl groups, respectively, the subscripts p is an integer of at least 3, q, r and s are each zero or a position integer and t is an integer of at least 2:

$[-Si(OMe)(CH_2SH)-O-]_p$;

$[-SiMe(CH_2SH)-O-]_p$ $[-Si(OMe)(CH_2CH_2SH)-O-]_p$;

$[-Si(OMe)(CH_2CH_2CH_2SH)-O-]_p$;

$[-SiMe(CH_2CH_2SH)-O-]_p$;

$[-SiMe(CH_2CH_2CH_2SH)-O-]_p$;

$[-Si(O-SiMe_2)(CH_2CH_2CH_2SH)-O-]_p$;

$HS-C_3H_6-SiMe(OMe)-O-[-SiMe_2-O-]_q-[-SiPh_2-O-]_r-[-SiMe(C_3H_6SH)-O-]_s-SiMe(OMe)-C_3H_6SH$; and $Me_3Si-O-[-SiMe_2-O-]_q-[-SiPh_2-O-]_r-[-SiMe(C_3H_6SH)-O-]_t-SiMe_3$;

and wherein the organopolysiloxane as the component (C) is a compound having the general formula

in which R is a monovalent hydrocarbon group free from aliphatic unsaturation and the subscript e is zero, 1, 2 or 3.

* * * * *